US009116895B1

(12) United States Patent
Eveland et al.

(10) Patent No.: US 9,116,895 B1
(45) Date of Patent: Aug. 25, 2015

(54) DOCUMENT PROCESSING SYSTEM AND METHOD

(75) Inventors: Christopher K. Eveland, Wyoming, OH (US); John W. Caven, III, Jacksonville, FL (US); Robert B. Menzel, Jacksonville, FL (US)

(73) Assignee: INFOTECH INTERNATIONAL LLC, Jacksonville, FL (US)

( * ) Notice: Subject to any disclaimer, the term of this patent is extended or adjusted under 35 U.S.C. 154(b) by 302 days.

(21) Appl. No.: 13/327,633

(22) Filed: Dec. 15, 2011

Related U.S. Application Data

(60) Provisional application No. 61/527,581, filed on Aug. 25, 2011.

(51) Int. Cl.
*G06F 17/30* (2006.01)

(52) U.S. Cl.
CPC ...... *G06F 17/3005* (2013.01); *G06F 17/30061* (2013.01); *G06F 17/30064* (2013.01)

(58) Field of Classification Search
CPC .......... G06F 17/3005; G06F 17/30061; G06F 17/30064
See application file for complete search history.

(56) References Cited

U.S. PATENT DOCUMENTS

| | | | | |
|---|---|---|---|---|
| 5,515,488 | A * | 5/1996 | Hoppe et al. | 345/440 |
| 5,950,206 | A * | 9/1999 | Krause | 1/1 |
| 6,128,613 | A | 10/2000 | Wong et al. | |
| 2005/0160084 | A1* | 7/2005 | Barrett | 707/3 |
| 2005/0171940 | A1* | 8/2005 | Fogg et al. | 707/3 |
| 2005/0251737 | A1 | 11/2005 | Kobayashi et al. | |
| 2006/0004734 | A1* | 1/2006 | Malkin et al. | 707/4 |
| 2006/0212327 | A1* | 9/2006 | Norman | 705/8 |
| 2008/0077530 | A1* | 3/2008 | Banas et al. | 705/50 |
| 2008/0195434 | A1* | 8/2008 | Broughton | 705/7 |
| 2008/0215552 | A1* | 9/2008 | Safoutin | 707/3 |
| 2008/0270391 | A1* | 10/2008 | Newbold et al. | 707/5 |
| 2009/0228777 | A1* | 9/2009 | Henry et al. | 715/230 |
| 2009/0265631 | A1 | 10/2009 | Sigurbjornsson et al. | |
| 2010/0076972 | A1 | 3/2010 | Baron et al. | |
| 2010/0121842 | A1 | 5/2010 | Klinkott | |
| 2010/0161495 | A1* | 6/2010 | Olson et al. | 705/80 |
| 2010/0185547 | A1* | 7/2010 | Scholar | 705/80 |
| 2010/0195909 | A1 | 8/2010 | Wasson et al. | |

OTHER PUBLICATIONS

Final Office Action on U.S. Appl. No. 13/327,648, mail date Jun. 18, 2014, 22 pages.
InfoTech's early functioning system [browser screenshots], as disclosed to industry trade organization in Nov. 2010, 2 pages.

(Continued)

*Primary Examiner* — Neveen Abel Jalil
*Assistant Examiner* — Kristofer Biskeborn
(74) *Attorney, Agent, or Firm* — Foley & Lardner LLP

(57) ABSTRACT

A computer-implemented method comprises storing a plurality of construction project specification documents in a data storage system. The method further comprises, for each of the plurality of construction project specification documents, extracting a plurality of blocks of text from the document, extracting formatting information for the document based on the extracted text blocks, generating a location descriptor for each of the text blocks based on the formatting information, the location descriptor indicating the location of the text block within the document, determining the type of text contained in each of the text blocks, and storing the location descriptor and the type of text contained in the text block for each of the text blocks.

22 Claims, 17 Drawing Sheets

(56) References Cited

OTHER PUBLICATIONS

McGraw-Hill Construction, Product Brochure for Dodge SpecShare Suite from Feb. 4, 2011, 10 pages.

Screenshots of Reed Construction Data's system as of 2011, retrieved from the internet at www.reedconnect.com and www.reedconstructiondata.com, 2 pages.

* cited by examiner

FIG. 7

2.03 GROUT MATERIALS
A. Manufacturers:
1. Bonsal American, Inc; ProSpec Sanded Tile Grout 700; www.prospec.com.
2. Custom Building Products; Prism SureColor Grout; www.custombuildingproducts.com.
3. LATICRETE International, Inc; LATICRETE SpectraLOCK PRO Grout; www.laticrete.com.
4. Substitutions: See Section 01 6000 - Product Requirements.
B. Grout: Polymer modified cement grout, sanded or unsanded, as specified in ANSI A118.7.

PART 3 EXECUTION 3.01 EXAMINATION
A. Verify that concrete sub-floor surfaces are ready for tile installation by testing for moisture emission rate and alkalinity; obtain instructions if test results are not within the following limits:
1. Moisture emission rate: Not greater than 3 lb per 1000 sq ft per 24 hours when tested using calcium chloride moisture test kit for 72 hours.
2. Alkalinity: pH range of 5-9.

3.02 PREPARATION
A. Protect surrounding work from damage.
B. Vacuum clean surfaces and damp clean.
C. Seal substrate surface cracks with filler. Level existing substrate surfaces to acceptable flatness tolerances.

3.03 INSTALLATION - GENERAL
A. Install tile and thresholds and grout in accordance with applicable requirements of ANSI A108.1 through A108.13, manufacturer's instructions, and The Tile Council of North America Handbook recommendations.
B. Lay tile to pattern indicated. Do not interrupt tile pattern through openings.
C. Cut and fit tile to penetrations through tile, leaving sealant joint space. Form corners and bases neatly. Align floor joints.

Chris's Chips & Chops 09 3000-2

TILING

FIG. 12B

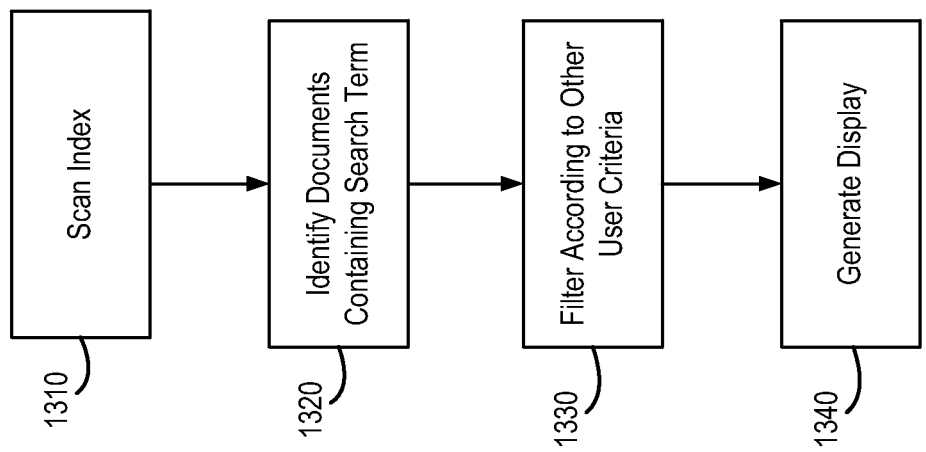

DOCUMENT PROCESSING SYSTEM AND METHOD

CROSS-REFERENCE

This application claims the benefit of U.S. Prov. No. 61/527,581, filed Aug. 25, 2011, entitled "Document Processing System and Method," hereby incorporated by reference in its entirety.

BACKGROUND

It is sometimes desirable to process and analyze large volumes of documents. As an illustrative example, construction projects are typically described by plans and specifications (herein, "spec documents"). While the plans give a visual representation of the project, the spec documents give all of the details in textual form. A typical spec document is approximately 500 pages in length and covers everything from the bidding procedures that contractors or subcontractors are to follow before being selected, through the types of products, materials, and methods used during construction, to how the site will be cleaned up when completed. Such comprehensive information about active and planned projects makes these spec documents a valuable source of marketing intelligence and sales leads for businesses serving the construction industry.

As a result, various publication services exist that collect plans and spec documents from various sources. To the extent necessary, the publishers may also digitize hard copies and process them with optical character recognition (OCR) software. Some publishers also annotate the spec documents at a project level with metadata (such as the estimated size and cost of the project, key contacts, the type of construction, and so on). Finally, the publishers aggregate the spec documents in a database and disseminate subsets of the spec documents to subscribers. The subscribers to such services may be, for example, building products manufacturers that use the spec documents for marketing intelligence and sales leads.

Because a national feed from one of the larger publishers is approximately fifty million pages per year, this is too much information for a single person (or even a reasonably sized team) to analyze to find actionable information or to synthesize new information. The problem is further compounded for manufacturers that subscribe to feeds from more than one publisher.

Various attempts have been made to process spec documents in a computer-assisted fashion. One technique that has been employed is to use text search with the documents and provide a user with a list of documents that match. For example, a user may be interested in searching for a cleaning product named "409". In basic searching systems, documents containing any copy of those 3 numbers will be returned to the user as matches, although many of those matches will not be for the cleaning product. In places it may be a page number, a section number, an area code in southeast Texas, or other unrelated reference. In an attempt to alleviate this problem, some systems have been built that use a hand labeled table of contents to allow for searches to be limited to specific sections of documents.

While existing systems for processing and analyzing large volumes of documents have proved useful, further enhancements are needed.

SUMMARY

According to an example embodiment, a system comprises a data storage system and an indexing and annotation engine. The indexing and annotation engine is configured to perform various operations for each of a plurality of documents stored in the data storage system. Specifically, the indexing and annotation engine is configured to extract a plurality of blocks of text from the document, extract formatting information for the document based on the extracted text blocks, generate a location descriptor for each of the text blocks based on the formatting information, the location descriptor indicating the location of the text block within the document, determine the type of text contained in each of the text blocks, and store the location descriptor and the type of text contained in the text block for each of the text blocks.

According to another example embodiment, a computer-implemented method comprises storing a plurality of construction project specification documents in a data storage system. The method further comprises, for each of the plurality of construction project specification documents, extracting a plurality of blocks of text from the document, extracting formatting information for the document based on the extracted text blocks, generating a location descriptor for each of the text blocks based on the formatting information, the location descriptor indicating the location of the text block within the document, determining the type of text contained in each of the text blocks, and storing the location descriptor and the type of text contained in the text block for each of the text blocks.

BRIEF DESCRIPTION OF THE DRAWINGS

FIGS. 2-9 show an example of a user interface that may be provided by the system of FIG. 1 according to an example embodiment.

FIGS. 11A-11B and 12A-12B show an example of a page that may be processed by an indexing and annotation engine of FIG. 1 according to an example embodiment.

FIG. 13 shows a flowchart showing generation of a screen display using indexing and annotation according to an example embodiment.

DETAILED DESCRIPTION OF EXAMPLE EMBODIMENTS

Figure 1:
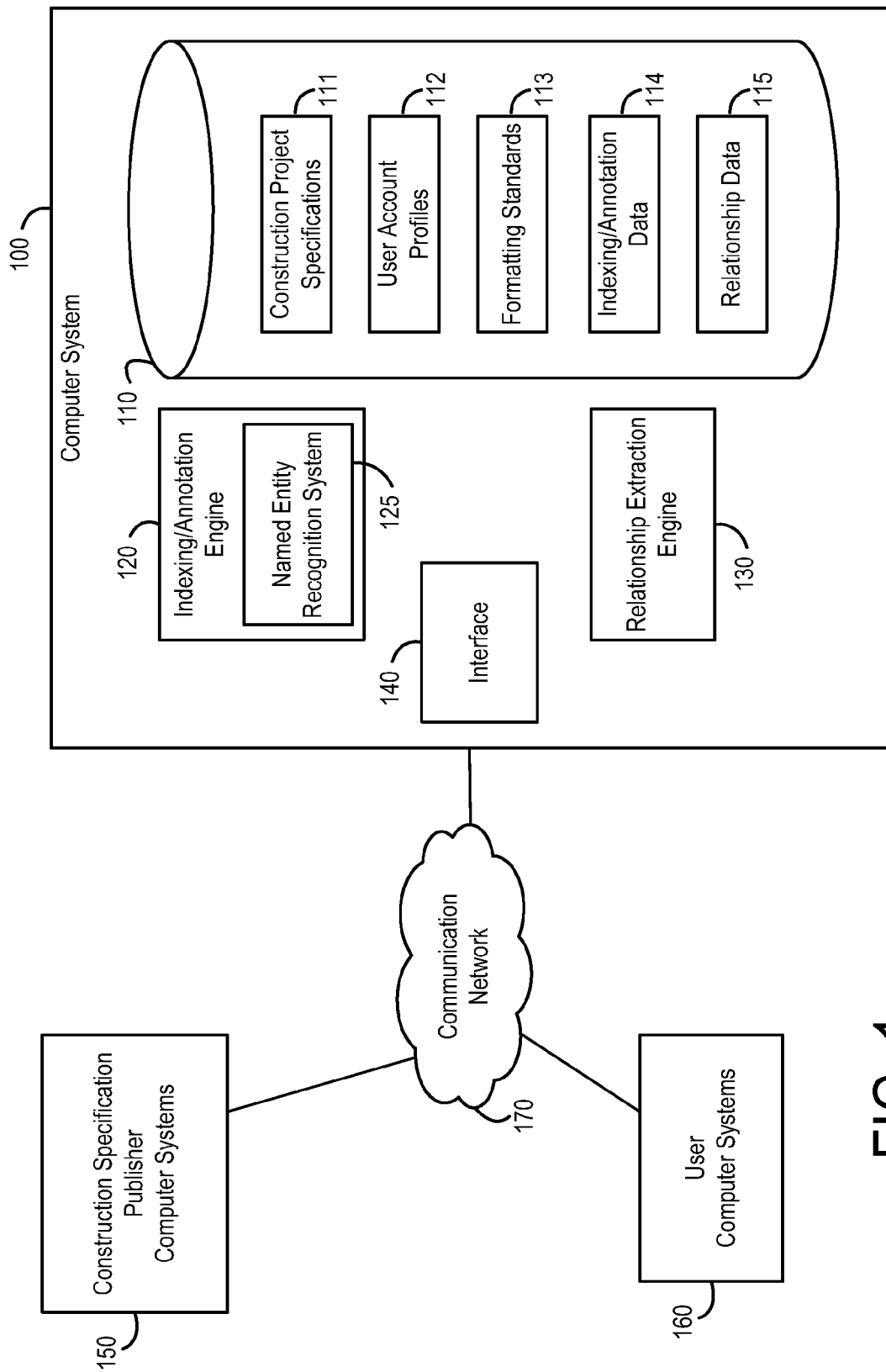
FIG. 1 shows a computer system for processing documents according to an example embodiment.

Referring now to FIG. 1, FIG. 1 shows a computer system 100 for processing documents, such as large volumes of unstructured or weakly structured documents according to an example embodiment. System 100 enhances the ability to search within the documents and also synthesizes information about the relationships between entities mentioned in the documents.

As shown in FIG. 1, the computer system 100 comprises a data storage system 110, an indexing and annotation engine 120, a relationship extraction engine 130 and an interface 140. The data storage system stores construction project specifications 111 which are received as input from computer system(s) 150 of one or more publishers of construction specifications. User account profile information 112 may be stored which indicates which users are licensed to access which standards. The documents may be digital text (e.g. in ASCII format), formatted text (e.g. PDF or Microsoft Word documents), or physical paper documents. The documents may be of any length and may be unstructured beyond the conventions of written text (i.e. words, sentences, paragraphs, sections, chapters, etc.).

In an example embodiment, the documents in the data storage system 110 may be loosely structured to the extent that content in the documents follows a predefined uniform organizational structure. The predefined uniform organizational structure need not dictate all organization structure of the content in the documents, however, it may provide a level of uniformity at least at a high level. For example, if the documents are books, the books may have a predefined uniform organizational structure if each of the books uses a uniform table of contents that specifies parts of the book, chapters within each part, and headings within each chapter. The predefined uniform organizational structure need not dictate all organization structure of the content in the books, in as much as there may be further subheadings and content within each heading the structure of which is not defined by the predefined uniform organizational structure. Additionally, the uniform organizational structure may be violated according to the author's preference or custom. For example, some authors may intentionally violate the uniform organizational structure in situations where the uniform organizational structure does not provide what the author considers to be an optimal structure for the document being authored (e.g., is considered incomplete in some respect). Assuming a uniform table of contents is used, then text found under a particular heading of a particular chapter of a particular part of the book will relate to the same topic, regardless which book in which the text is located. Information 113 regarding the predefined uniform organizational structure may be stored in the data storage system 110, either explicitly or implicitly (e.g., via the manner in which the indexing/annotation engine 114 is configured to operate).

In an example embodiment, the documents are spec documents relating to the construction industry, and the predefined uniform organizational structure is the Construction Specifications Institute (CSI) MasterFormat standard, which is a standard for organizing spec documents and other written information for commercial and institutional building projects. MasterFormat provides a master list of divisions, and section numbers and titles within each division, to follow in organizing information about a facility's construction requirements and associated activities. Each division contains a number of sections. Each section is divided into three parts—"general," "products," and "execution." Each part is organized by a standardized system of articles and paragraphs. The division and section within a spec document where a particular piece of text is located is indicative of the subject matter of the pertinent text. For example, text found in Division 09, Section 3000 of a spec document that follows the MasterFormat standard relates to tiling. As indicated above, the uniform organizational structure may sometimes be violated according to the author's preference or custom. In the case of the MasterFormat standard, for example, some authors may add divisions or CSI codes if their application is not covered in the official MasterFormat.

The data storage system 110 also stores indexing and annotation data 114 and relationship data 115 generated by the indexing and annotation engine 120 and the relationship extraction engine 130, respectively. As described in greater detail below, the indexing and annotation engine 120 takes the spec documents as input, processes their natural structure, and identifies named entities and other phrases of interest. The output of the indexing and annotation engine 120 includes a list of entities (words and multi-word phrases), paired with location information. "Words" in this context refers to strings of characters within the document separated by white-space or punctuation. Each such entity is additionally paired with its type (e.g., one of company-name, product-name, place, heading, etc.). The location information includes the document, page number, section number (which may be assigned sequentially in the event that the source document does not have numbered sections), and so on. The output of the indexing and annotation engine 120 (i.e., the indexing and annotation data 114) is stored in the data storage system 110. Further details regarding the indexing and annotation engine 120 are discussed below in connection with FIGS. 10A-10B, 11A-11B, and 12A-12B.

The relationship extraction engine 130 reads rows from the database and uses them to infer relationships between entities. As described in greater detail below, the relationship extraction engine 130 scans blocks of rows from the output generated by the indexing and annotation engine 120 and uses statistical methods to assign a score indicating the strength of the relationship between two words or entities. For example, Dupont and Tyvek may have a high score because Tyvek is a product sold by Dupont. Conversely, Tyvek and Formula 409 may have a low score, because one is a weather barrier and the other is a cleaning product. This process is performed for all combinations (possible pairs) of entities in the indexing and annotation data 114. These scores may be either requested directly by a user interface, or processed and stored for later access as relationship data 115 in the data storage system 110. Further details regarding the relationship extraction engine 130 are discussed below in connection with FIG. 14.

The stored indexing and annotation data 114 and the stored relationship data 115 enables the system 100 to provide context sensitive searching for entities (words and multiword phrases) and to provide information regarding relationships between entities. Such information may be made available to users using computing systems 160. For example, interface 140 may provide a web interface that is accessible to via a global communication network 170 (e.g., the Internet). This approach scales well and can be applied to all documents, even in large volumes.

Figure 2:
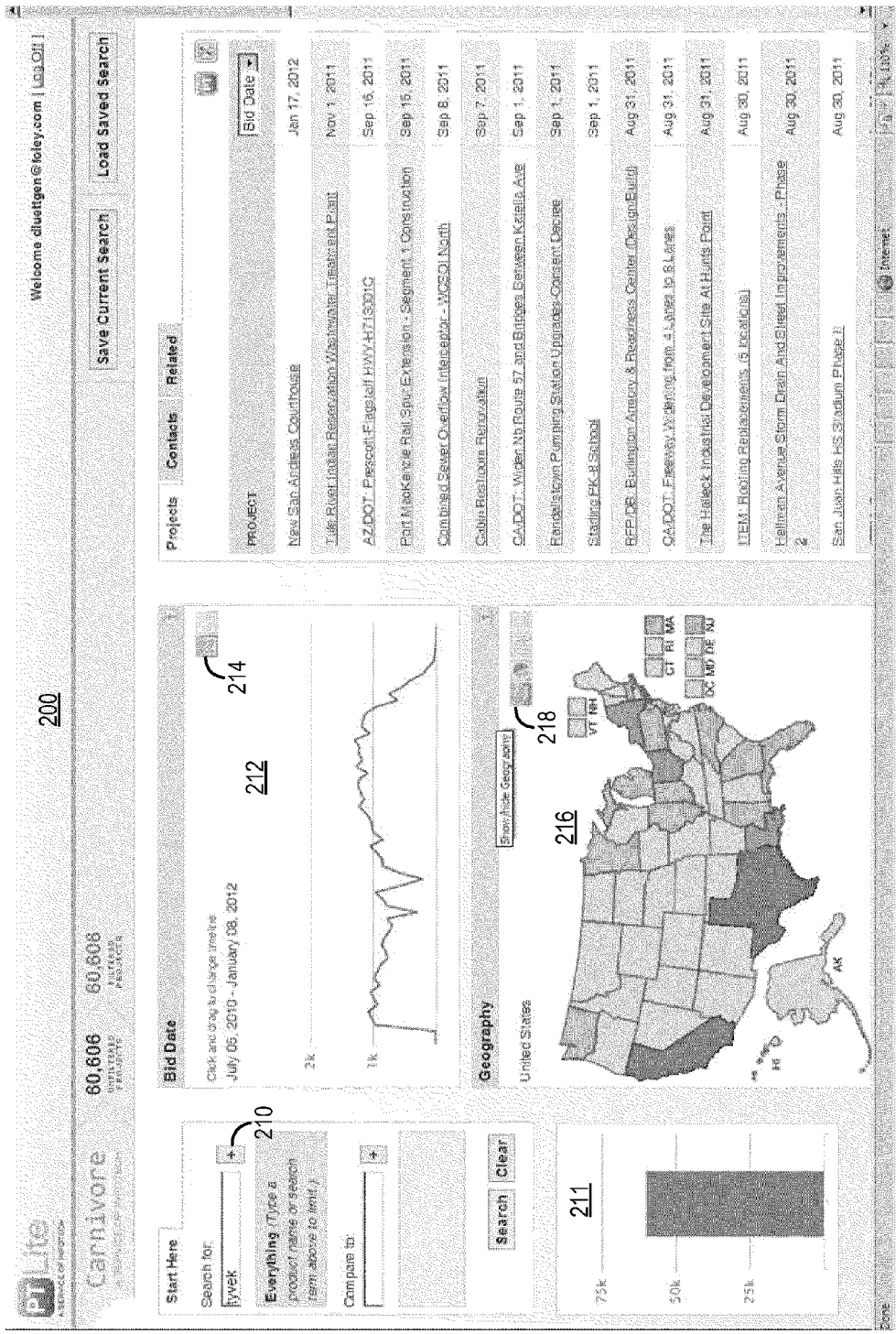

Referring now to FIGS. 2-9, an example of a user interface that may be provided by the interface 140 is shown according to an example embodiment. Referring first to FIG. 2, FIG. 2 shows a screen display 200 in which a user has entered query ("Tyvek") in a search query field 210. In response, the interface 140 has provided the user (via the screen display 200) with various information regarding the use of the Tyvek product in the construction industry (i.e., as reflected in spec documents). In field 211, a bar graph is shown reflecting the total number of times the term "Tyvek" appears in spec documents stored in data storage system 110. In field 212, a timeline is shown reflecting the number of times the term "Tyvek" appears in spec documents having a bid date during the timeframe Jul. 5, 2010 to Jan. 8, 2012. For example, for projects having a bid date during the week starting Aug. 2, 2010, the term "Tyvek" appears in approximately 1000 spec documents. Buttons 214 are provided that allow the user to change the display format. For example, a button 214 may be pressed by the user to view the data in a tabular format (i.e., a listing of weeks and the number of spec documents using the term "Tyvek" for each week). The user may also be provided with the ability to zoom in and zoom out on the timeline (e.g., to focus in on data for a particular quarter). The data that is shown on screen display 200 is determined by the timeline selected by the user. Hence, when the user changes the timeline in field 212, the rest of the data in screen display 200 is updated and the user is provided with an updated screen display.

A geography field 216 provides a map reflecting the number of times the term "Tyvek" appears in spec documents for projects in various geographic regions (e.g., states). For example, different states may be color-coded (e.g., different shades of colors may be used) to reflect the varying frequencies of usage of the term "Tyvek" in spec documents. Buttons 218 may be provided that allow the user to display the data in different formats (e.g., map, pie chart, bar graph, tabular, etc.). Initially, all states in the United States are shown. Again, however, the user may be provided with the ability to focus in on certain geographies. For example, if a salesperson's territory is Texas, Oklahoma, and Louisiana, the sales person may select Texas, and then Oklahoma, and then Louisiana (e.g., through a series of three mouse clicks) to be presented with only the data for those three states. Again, the data that is shown on screen display 200 is determined by the geography selected by the user. Hence, when the user changes the geography in field 216, the rest of the data in screen display 200 is updated and the user is provided with an updated screen display. For example, the number of projects that are shown on timeline in field 212 may decrease when only a specific geographic region, such as Texas, is selected.

Referring now also to FIGS. 3-6, FIGS. 3-6 show additional graphs that may be displayed to the user. Although the graphs shown in FIGS. 3-6 are presented in separate Figures, as will be appreciated, the graphs shown in FIGS. 3-6 may constitute part of the screen display 200 (e.g., the user may be presented with the graphs upon scrolling down on the screen display shown in FIG. 2).

Figure 3:
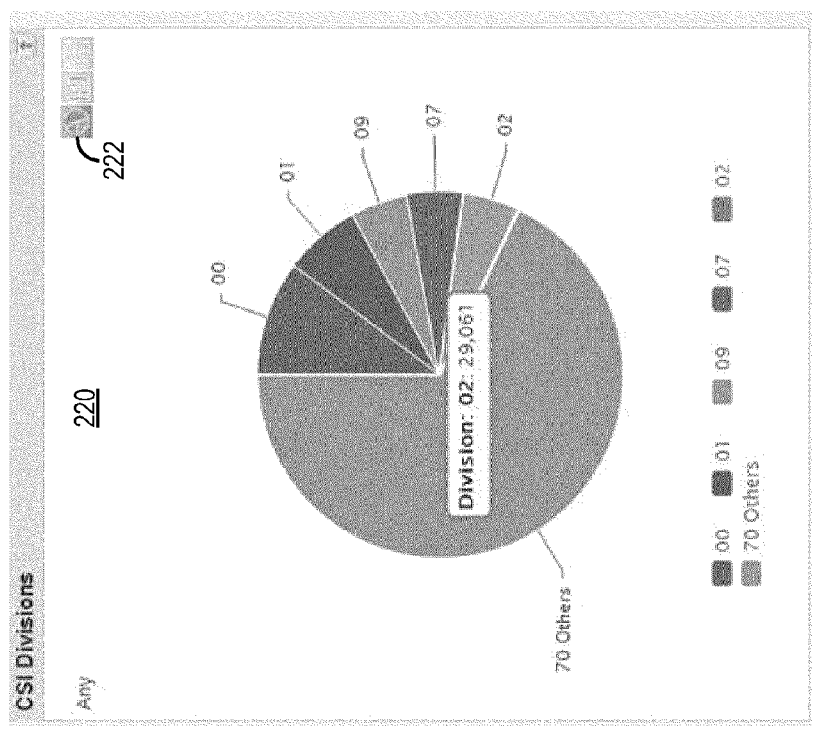

Referring first to FIG. 3, a CSI divisions field 220 is shown that reflects the number of times the term "Tyvek" appears in various parts of spec documents. As indicated above, under the MasterFormat standard, spec documents are organized in divisions. "Divisions" in the context of FIG. 3 refers to Masterformat divisions. Hence, the division in which the term appears is indicative of the manner in which Tyvek is being referenced in the spec documents (i.e., the context in which it is being specified). Buttons 222 may be provided that allow the user to display the data in different formats (e.g., pie chart, bar graph, tabular, etc.). Again, the data that is shown on screen display 200 is determined by the division selected by the user. Initially, all divisions are shown. However, if the user selects only certain divisions, then the rest of the data in screen display 200 is updated and the user is provided with an updated screen display. For example, the number of projects that are shown on timeline in field 212, which may have already decreased due to selection of a specific geographic region, may decrease further when only a specific division is selected.

Figure 4:
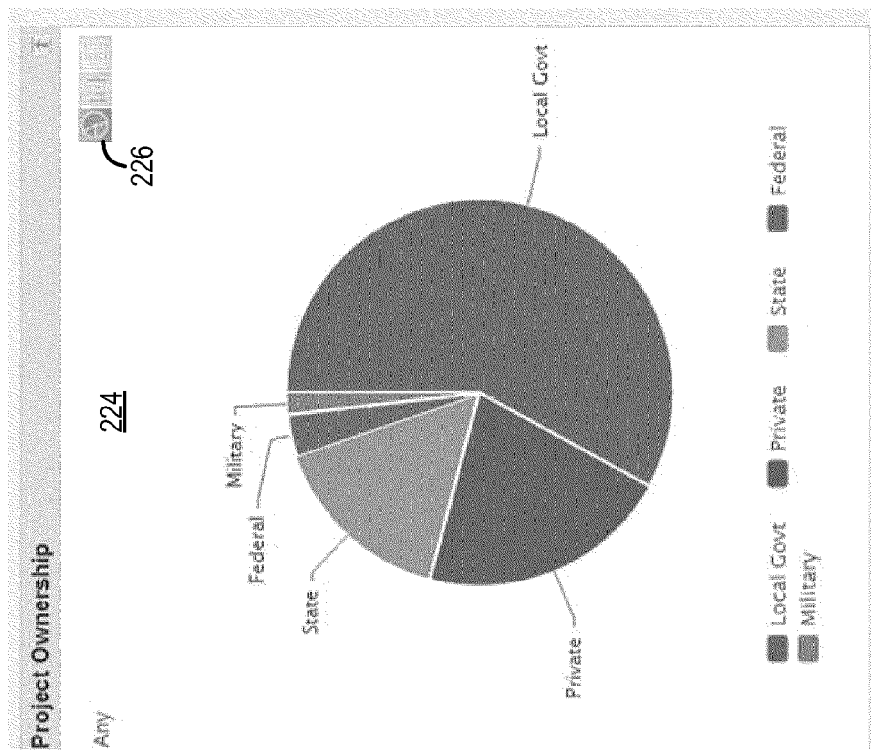

Referring next to FIG. 4, a project ownership field 224 is shown that reflects the number of spec documents referencing the term "Tyvek" for projects owned by different types of entities (e.g., private, Federal, state, etc.). Buttons 226 may be provided that allow the user to display the data in different formats (e.g., pie chart, bar graph, tabular, etc.). Again, the data that is shown on screen display 200 is determined by the ownership category selected by the user. Initially, all ownership categories are shown. However, if the user selects only certain types of owners, then the rest of the data in screen display 200 is updated and the user is provided with an updated screen display.

Figure 5:
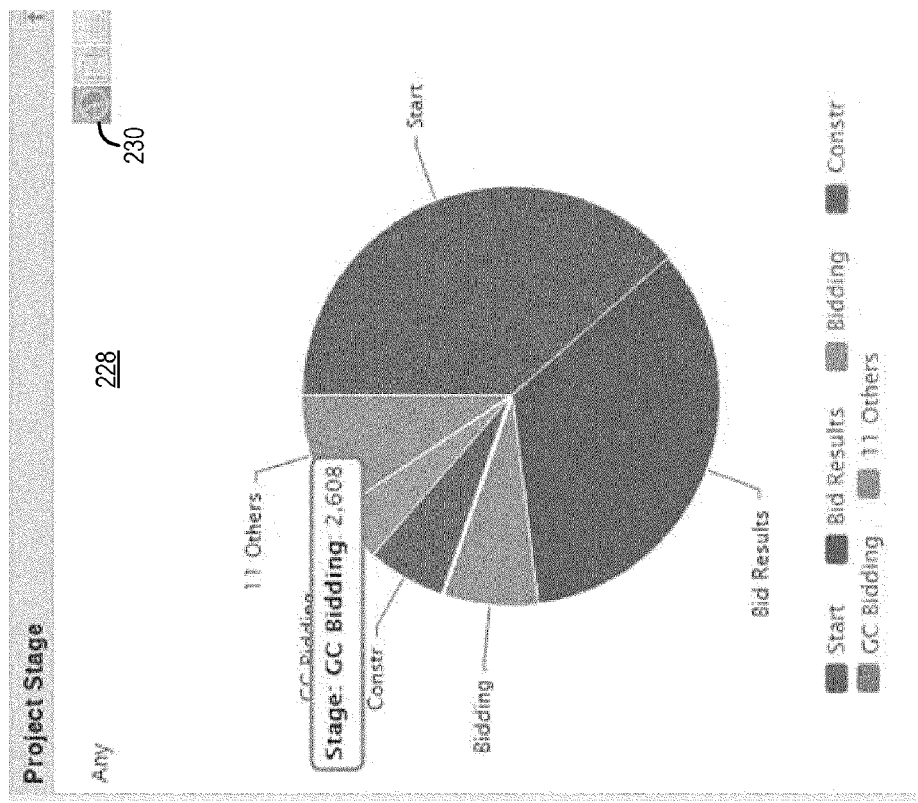

Referring next to FIG. 5, a project stage field 228 is shown that reflects the number of projects referencing the term "Tyvek" for each of various different categories of stages of projects (e.g., bidding, starting, etc.). Buttons 230 may be provided that allow the user to display the data in different formats (e.g., pie chart, bar graph, tabular, etc.). Again, the data that is shown on screen display 200 is determined by the project stage category selected by the user. Initially, all project stages are shown. However, if the user selects only certain types of project stages, then the rest of the data in screen display 200 is updated and the user is provided with an updated screen display.

Figure 6:
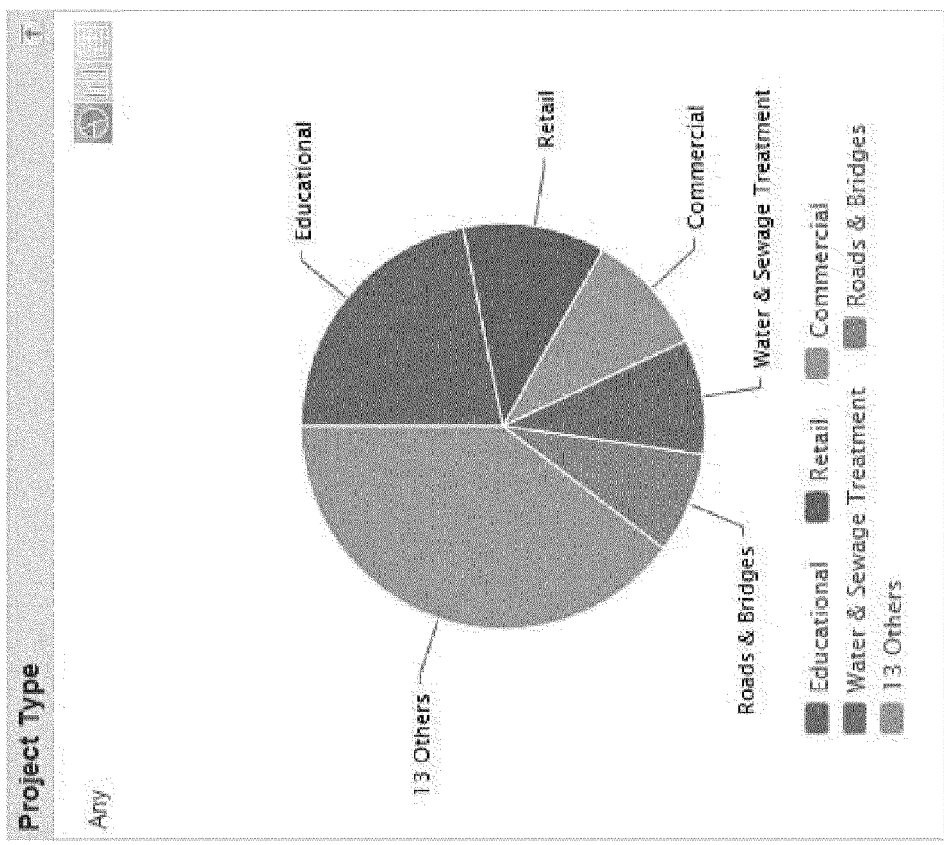

Referring next to FIG. 6, a project type field 231 is shown that reflects the number of project types for various different categories of projects (e.g., commercial, retail, roads and bridges, educational, etc.). Buttons 232 may be provided that allow the user to display the data in different formats (e.g., pie chart, bar graph, tabular, etc.). Again, the data that is shown on screen display 200 is determined by the project type category selected by the user. Initially, all project types are shown. However, if the user selects only certain types of project stages, then the rest of the data in screen display 200 is updated and the user is provided with an updated screen display.

Hence, as shown in FIGS. 2-6, the system 100 provides the user with considerable ability to select and analyze data. The user may zoom down on any one or more of the categories of data discussed above. While certain categories have been described, it will be appreciated that fewer, additional, or different categories may also be provided. It may be noted that data for each spec document (e.g., indicating geography (FIG. 2), project ownership (FIG. 4), project stage (FIG. 5)) may be obtained from meta data provided by publishers, meta data added manually after the spec document is received from publishers, based on analysis of the text data in the spec document, or in another manner. The system 100 then filters all of the spec documents in the data storage system 110 to determine which spec documents fit the user's search criteria, as previously indicated.

Figure 7:
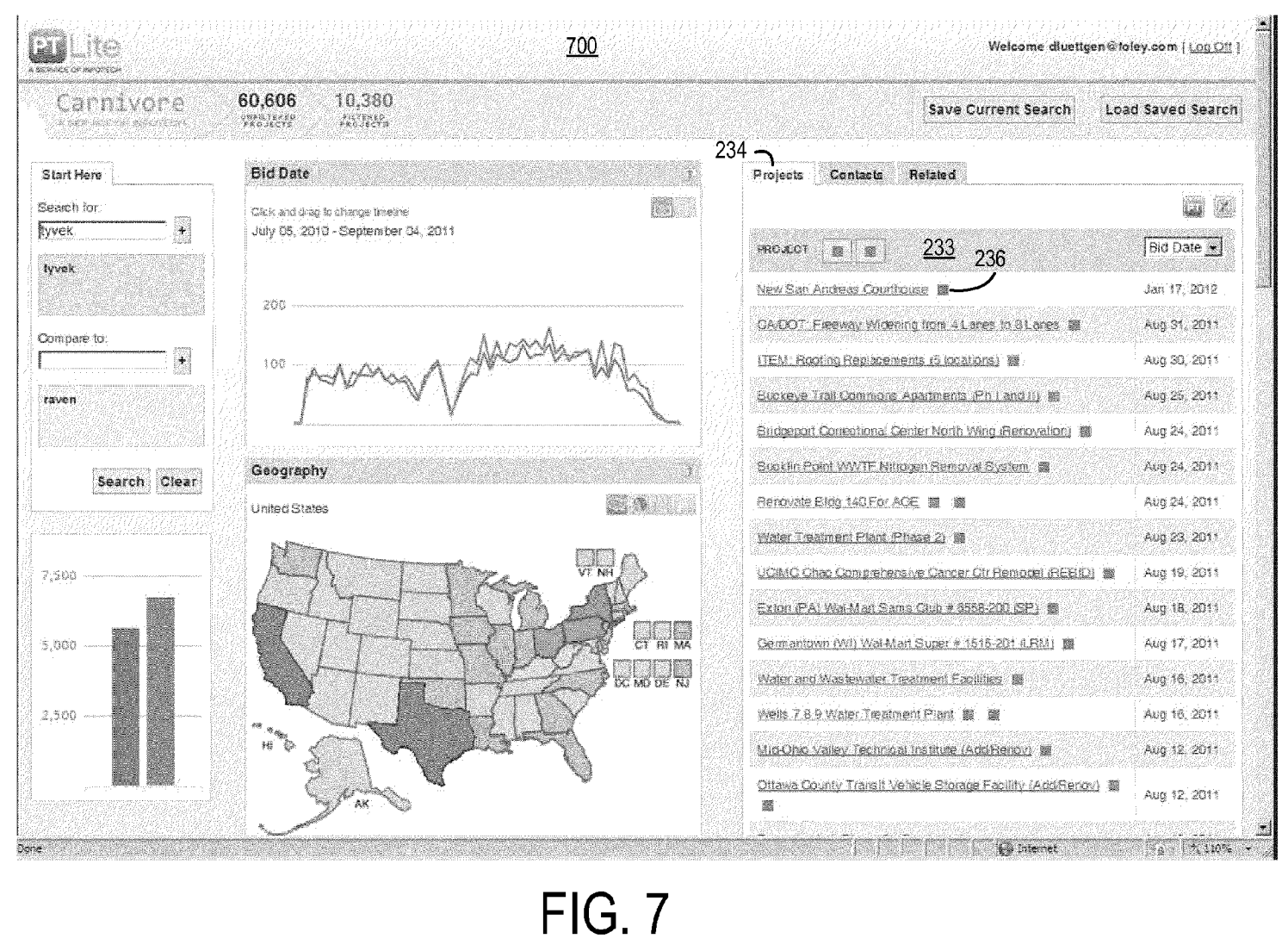

Referring now to FIG. 7, in FIG. 7 a screen display 700 is shown in which the user is conducting comparative research on two products (in this example, Tyvek and Raven). Hence, in FIG. 7, the data described above is shown for both products. For example, a salesperson may compare how often Tyvek is appearing in project specifications with how often Raven is appearing in project specifications for any one or more of a given time period, projects in a given geography, projects owned by certain types of owners, projects that are at certain stages in the construction process, projects of a given type, and/or appearance in specific parts of the project specification.

Also shown in FIG. 7 is a field 233 that contains a list of projects meeting the parameters specified by the user as discussed above. (A similar field is shown in FIG. 2) The list of projects is presented responsive to selection of a projects tab 234. Colored icons 236 may be used to reflect which projects (i.e., spec documents) refer to which products (i.e., Tyvek and/or Raven). Project names may be displayed as links which may be selected by the user. Upon selecting a link, the user may be provided with a copy of the spec document for the selected project. A selector icon 236 may be provided that causes the interface 140 to sort the data in different dimensions (e.g., bid date, project value, square feet, etc.).

Figure 8:
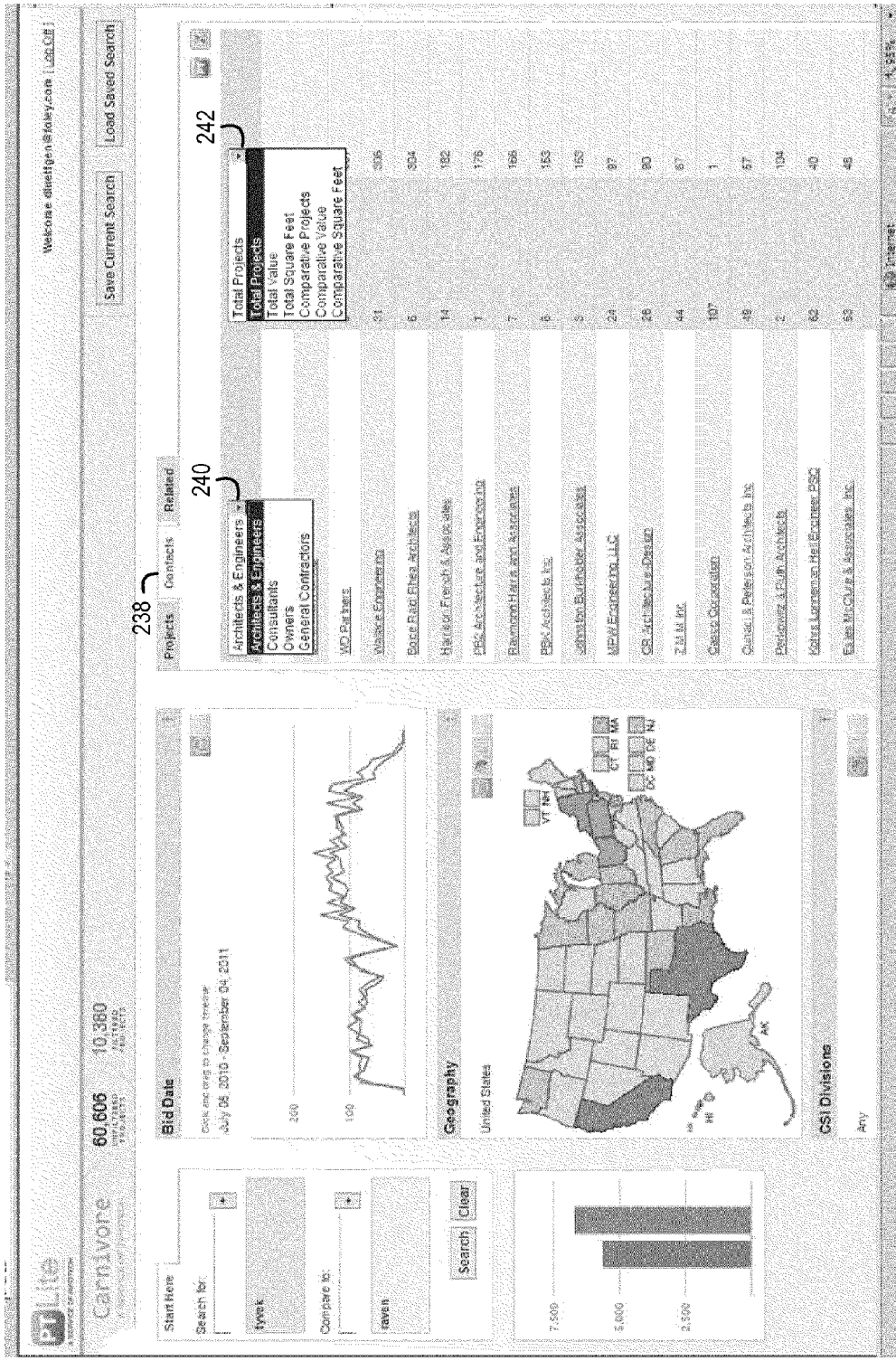

Referring now to FIG. 8, in FIG. 8, the user has selected a contacts tab 238. Various categories of contacts may be presented to the user (e.g., architects & engineers, consultants, owners, general contractors, etc.). Again, the contacts are entities that are associated with project specifications that meet the user's search criteria, as discussed above. In FIG. 8, the user has selected architects and engineers via a selector icon 240. Hence, a list of architects and engineers is presented to the user, along with the number of projects with which they are associated. The user may be presented with data for all projects or only data for certain types of projects, depending on selector icon 242. Contact names may be displayed as links which may be selected by the user. Upon selecting a link, the user may be provided with additional information (e.g., contact information, etc.) regarding a particular contact (e.g., a particular architect & engineering firm).

Figure 9:
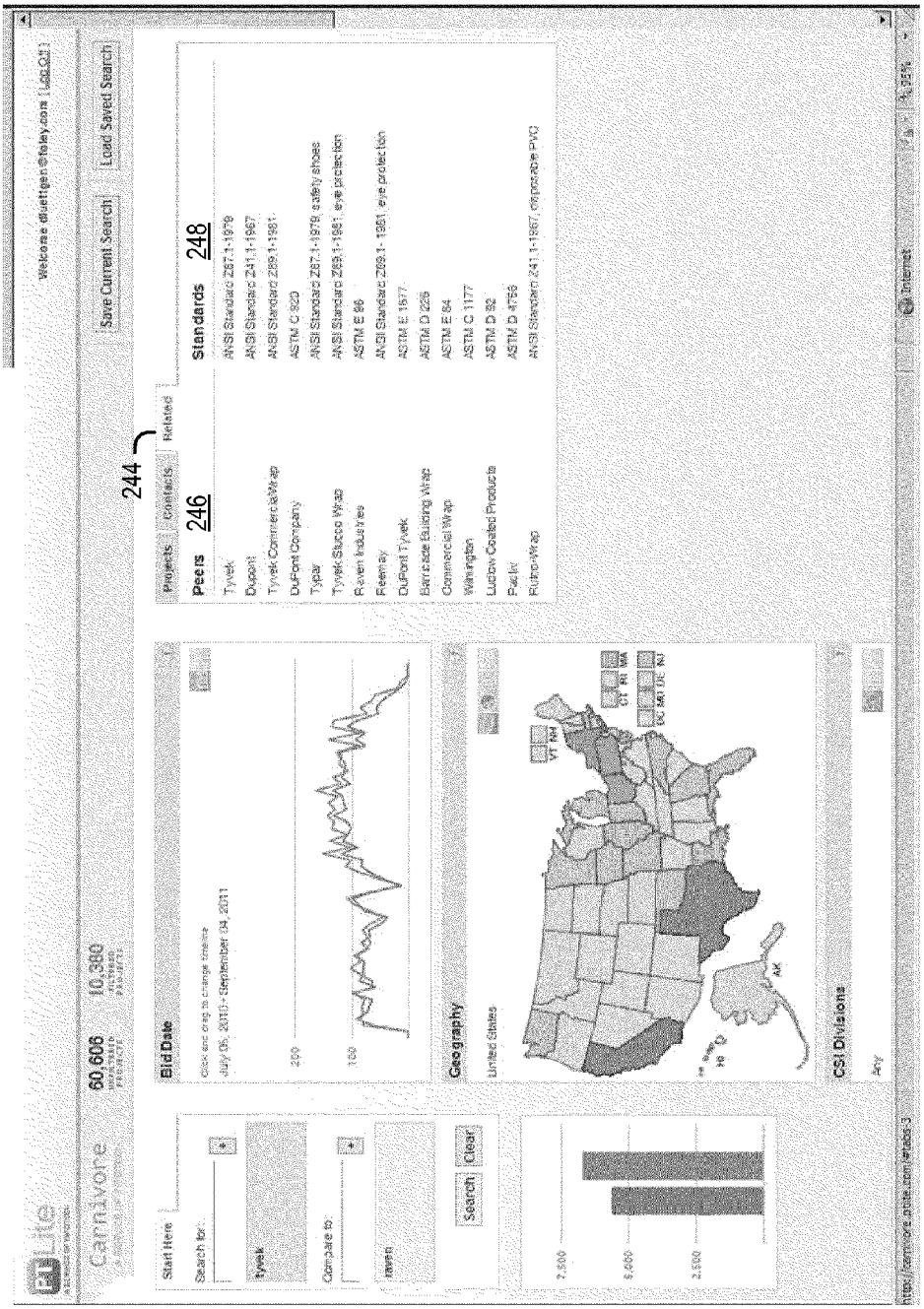

Referring now to FIG. 9, in FIG. 9, the user has selected a related tab 244. In FIG. 9, the user is presented with entities (words and multi-word phrases) that have a high relatedness score relative to the two terms specified by the user (Tyvek and Raven, in this example). The peers column 246 shows products and companies (collectively, "peers" in FIG. 9). As described in greater detail below, for the products and companies listed in FIG. 9, if a block of text spec document lists Tyvek, a high probability exists that the block of text will also include the other products and companies listed in FIG. 9 (i.e., a high probability relative to other products and companies that are not listed). For example, a user may be interested in finding out what other products compete with Tyvek and Raven. The peers column 246 also refers to Typar, which suggests that Typar may be a competing product (as indicated by the fact that spec documents that refer to Tyvek and/or Raven in a given block of text are also highly likely to refer to Typar). Of course, this type of research may be performed for other types of keywords as well (e.g., company names, etc.). While products and companies are grouped together in FIG. 9, as will be appreciated, products and companies may also be listed separately. The standards column 248 shows standards that are considered highly related to Tyvek. Hence, for example, if a block of text in a spec document refers to Tyvek, it is highly likely that the block of text will also include a reference to ANSI Standard Z87.1-1979. It will be appreciated that other categories of terms may also be listed.

Figure 10A:
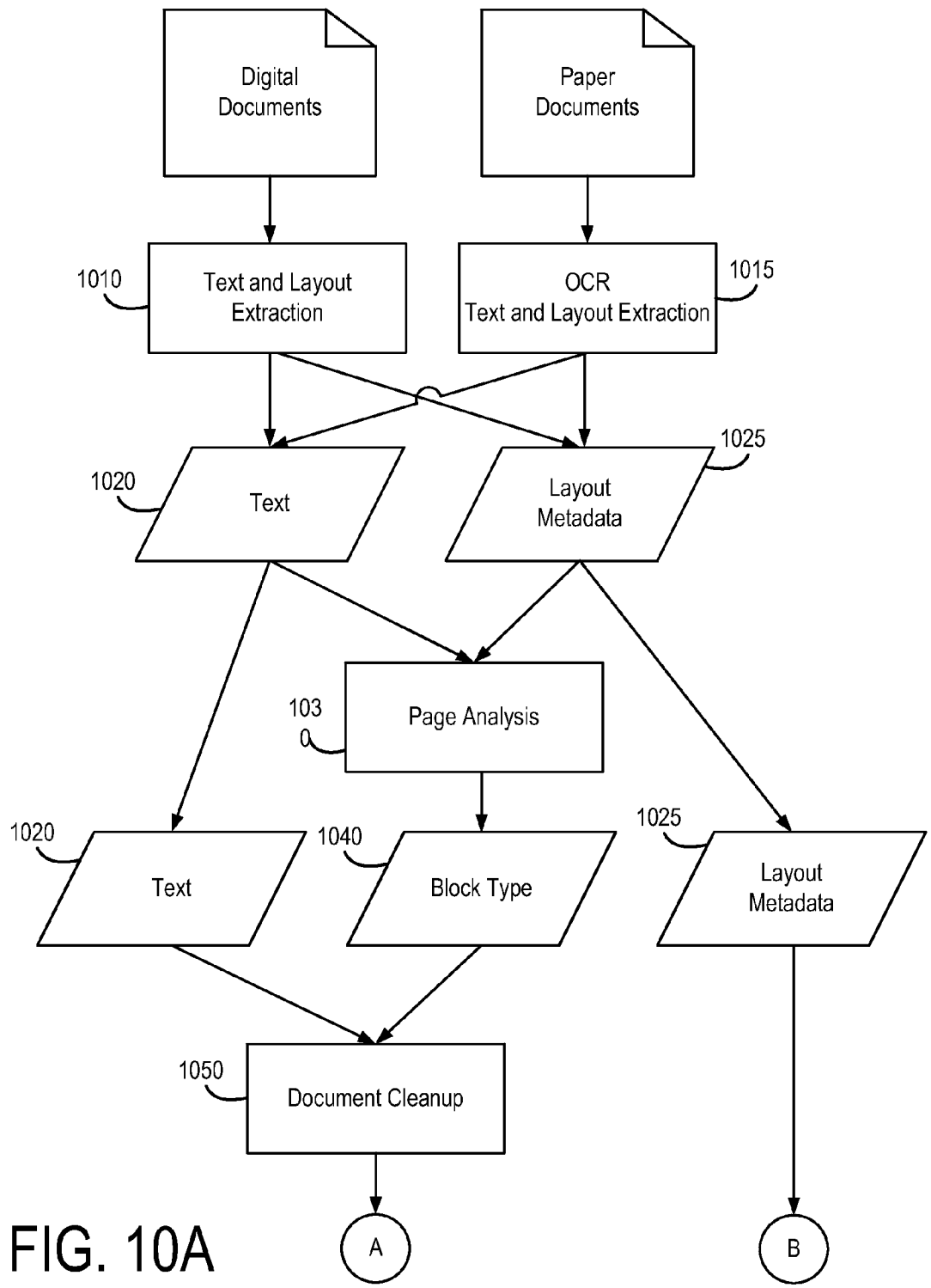
FIGS. 10A-10B show the operation of an indexing and annotation engine of FIG. 1 according to an example embodiment.
Figure 10B:
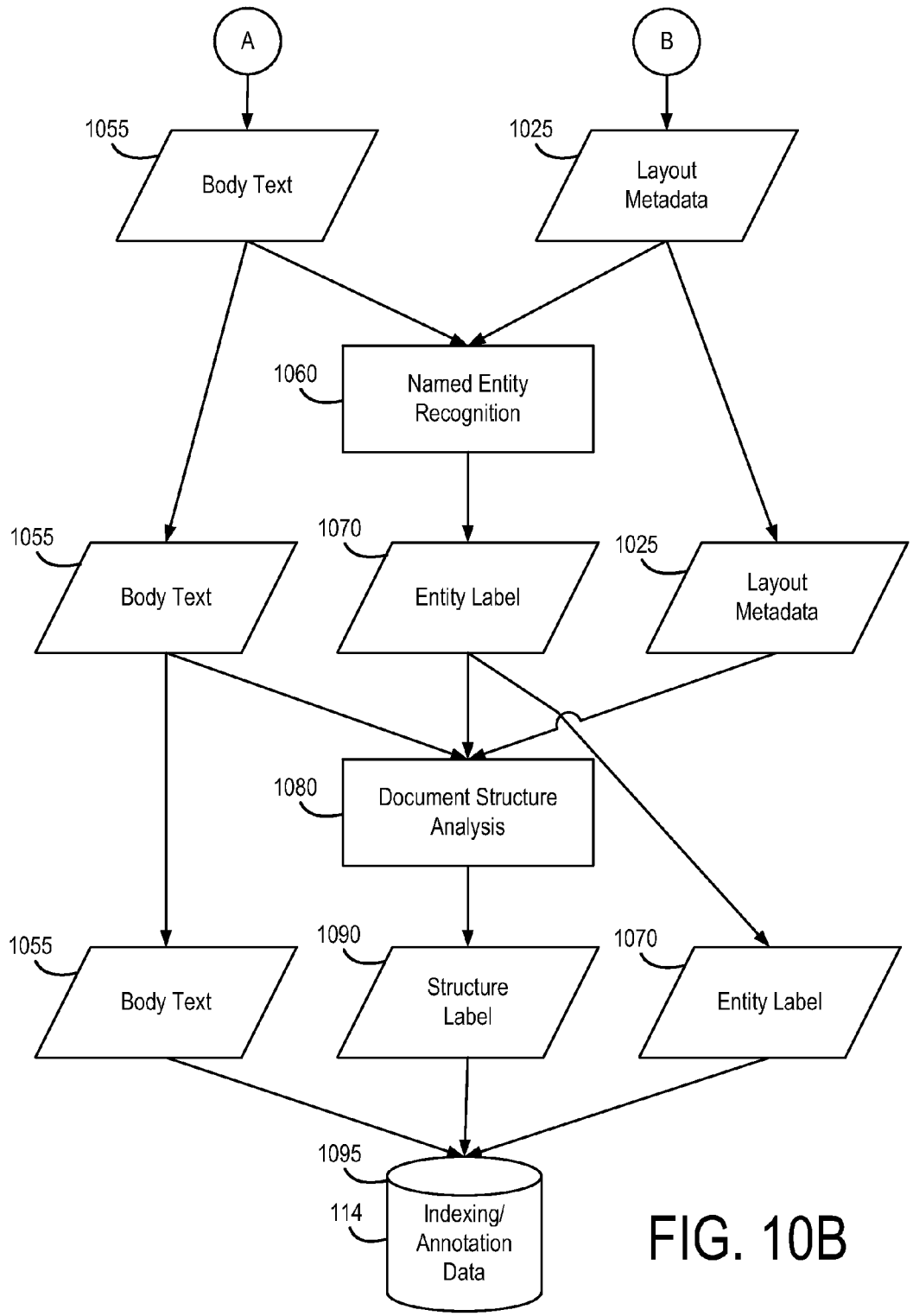
Figure 11A:
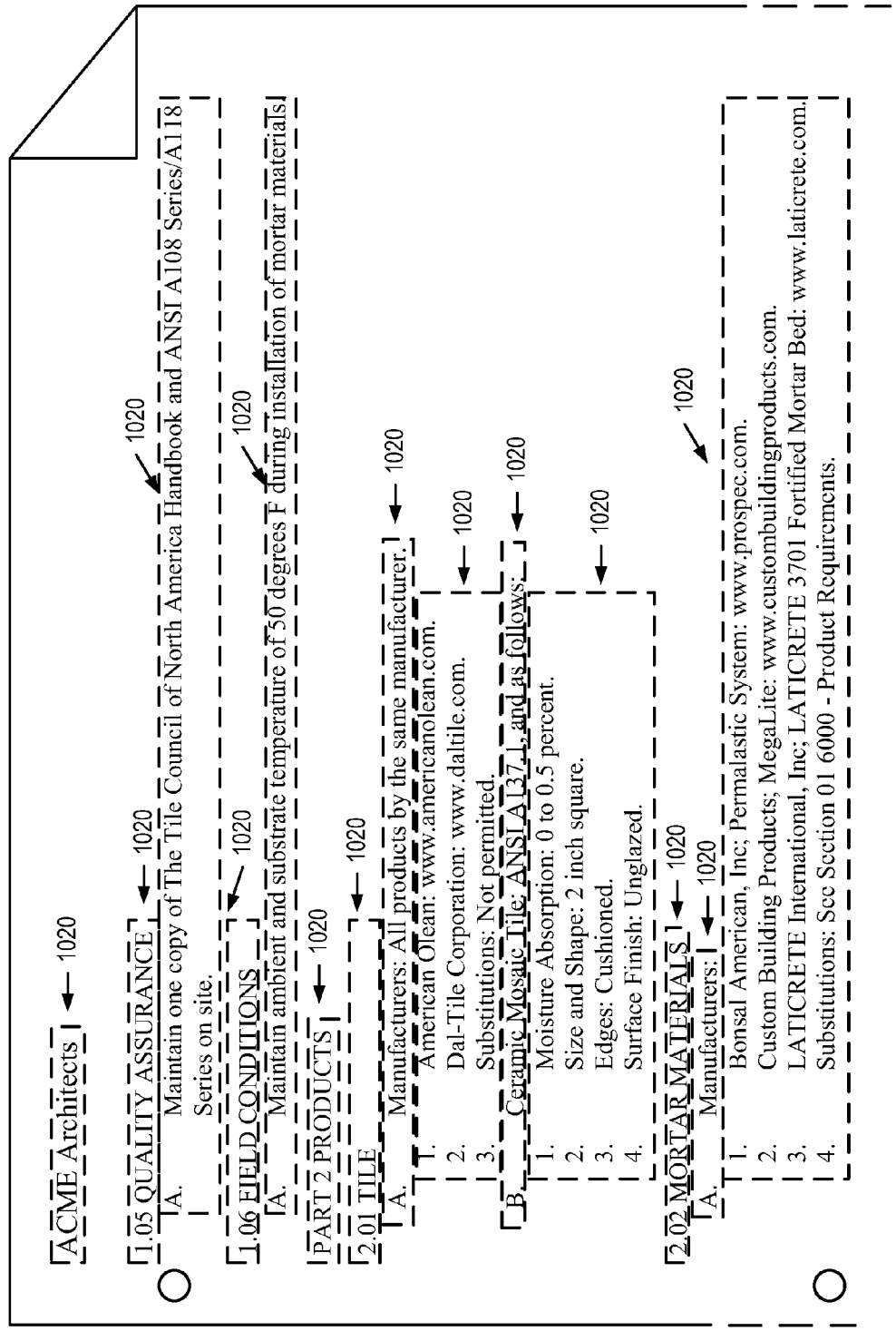
Figure 11B:
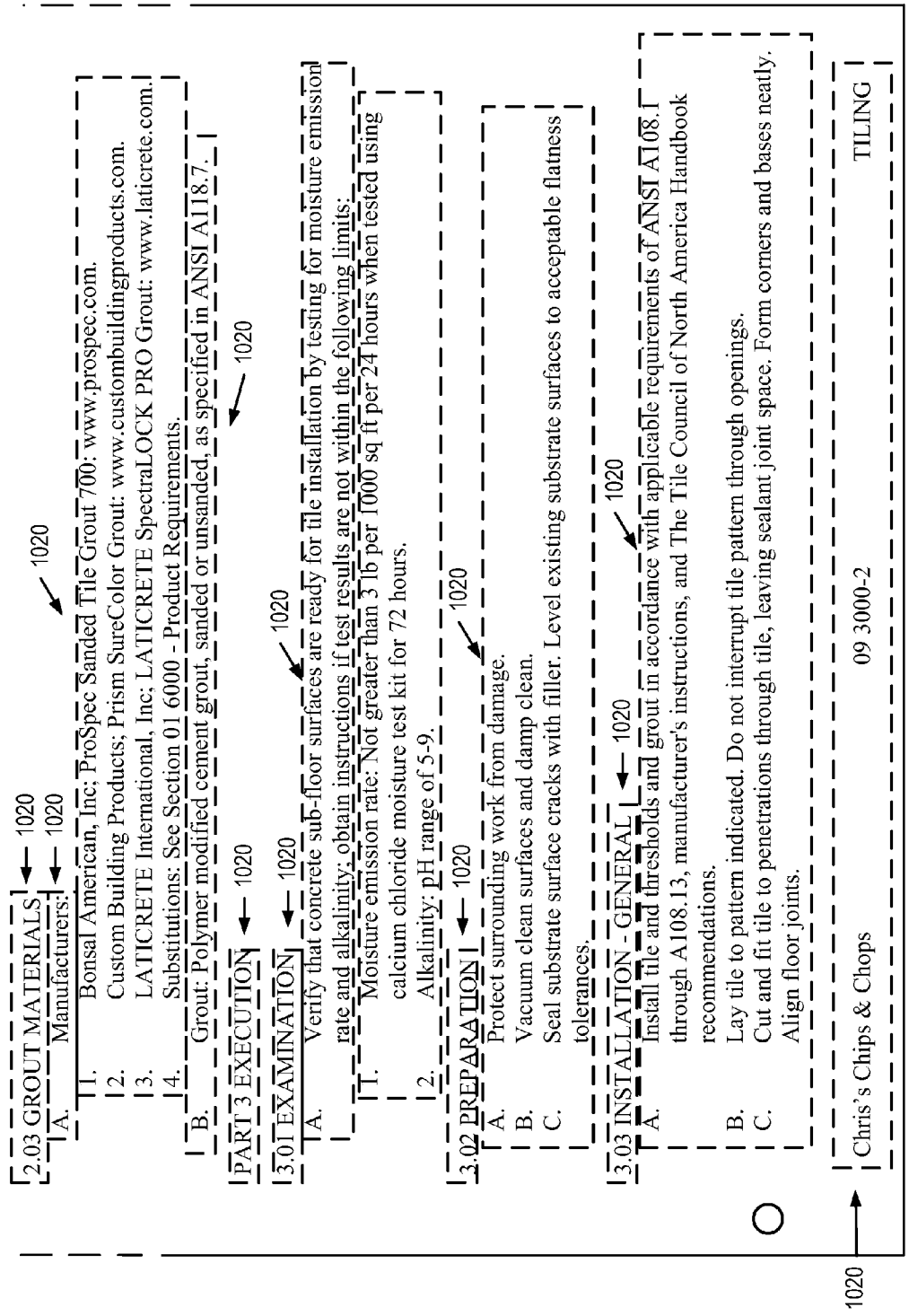

Referring now to FIGS. 10A-10B, FIGS. 10A-10B show the operation of the indexing and annotation engine 120 in greater detail according to an example embodiment. As described above, the input to engine 120 is a collection of documents, e.g., spec documents. The spec documents may be in either digital or paper format. In the event that the documents are in digital format, the engine 120 extracts blocks of text 1020 and pairs them with location and formatting information 1025, if any, at step 1010. For example, the location information may indicate where on the page a block of text was rendered, and the formatting information may include the font type or size, among other information. Referring now also to FIGS. 11A-11B, an example of a page that may be processed by engine 120 is shown. FIGS. 11A-11B show a page may be dissected into blocks of text 1020.

Alternatively, in the event that the input is physical paper copies of the documents, then at step 1015 an optical character recognition (OCR) process is performed on the documents. This may produce either raw text (ASCII) or formatted text (e.g. PDF) output. The output of step 1015 is the same as the output of step 1010: blocks of text 1020, with any position and formatting information 1025. In some embodiments, the spec documents may be annotated to provide meta data, as described above.

Figure 12A:
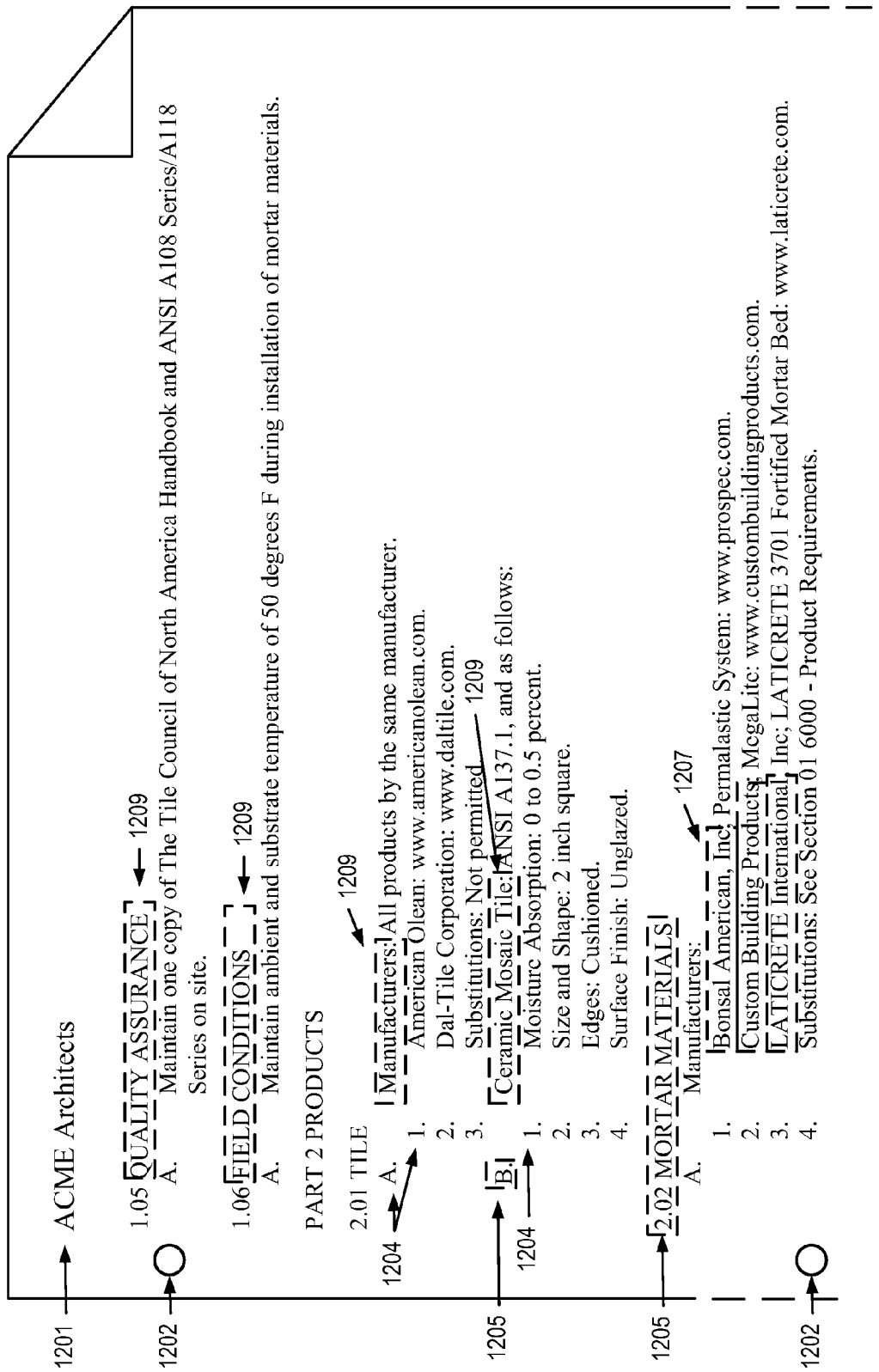

At step 1030, using the position and formatting information 1025, a page analysis is performed in which the text and its layout on the page is examined and labels are applied to each text block 1020. The labels indicate the type of text that is in the text block 1020. Referring now also to FIGS. 12A-12B, an example of a page that may be processed by engine 120 is shown. Labels include information such as "header" (for text 1201), "footer" (for text 1202), "marginal note/marking" (for text 1203, in this case markings from a 3-hole punch), or "body text". The body text is shown in FIG. 10B at 1055. Further information extracted from the page analysis may include block labels such as "increase in indent level" (e.g., for text 1204.), or "decrease in indent level" (e.g., for text 1205).

At step 1050, this information is used to clean up the text stream by removing everything except for the body text 1055, because all other information (e.g., headers, footers, markings) is unlikely to provide useful search or relationship information. In FIGS. 12A-12B, items 1201, 1202, and 1203 would skipped so as to provide a cleaner text stream for the remainder of the indexing process shown in FIGS. 10A-10B.

At step 1060, entity recognition is performed to add entity labels 1070 to the body text 1055. The entity recognition is performed by named entity recognition system 125, which may comprise a trainable software package configured to perform entity identification and entity extraction. The recognized entities may be either named entities, structure indicating entities, or relationship indicating entities. Named entities may include categories such as Product (e.g., text 1206), Company (e.g., text 1207), Place, Standard (e.g., text 1208), and Person. Further examples of named entities are phrases such as "Chemrex, Inc." labeled as a company, "409" labeled as a product, "Beaumont, Tex." labeled as a place, and so on. For example, such categories (company, product, standard) may be used to categories words as shown in FIG. 9, discussed above. Such categories may also be used to reduce false positive matches, e.g., to distinguish the cleaning product "409" from the area code "409," as discussed above. Structure indicating entities are words or phrases that indicate document structure, such as section titles which indicate the start of a section of a document. In FIGS. 12A-12B, the text 1209 are examples of headings that serve as structure indicating entities. As described in greater detail below, when an entity (e.g., a word, a multi-word phrase) is indexed and its location in the spec document is stored in the index, the location of the entity is specified in terms of document structure (e.g., relative to section headings, etc.) as opposed to pagination (i.e., the page upon which the word appears). Hence, the structure indicating entities may later be used in specifying the locations of other (lower level) entities with the spec document. Relationship indicating entities include phases in the body text such as "by", "a division of", "a product of", and so on. Such information may be used to determine relatedness of entities.

In an example embodiment, as part of the entity recognition process discussed above, the named entity recognition system 125 identifies multiword entities. For example, the named entity recognition system 125 may identify "Ceramic Mosaic Tile" and deem it to be a single unit. Such multiword entities may then be indexed in the same manner as single-word entities. In an example embodiment, each word in the document is indexed once as an individual word and once as part of a multiword entity. In an example embodiment, words are assigned to one and only one multiword entity.

At step 1080, the document structure is analyzed (including text, layout metadata, and any found entities) to build a hierarchical block descriptor for each block of text 1055 deemed to be a single unit. At the root of the hierarchy is the document. The next levels may include chapters (in the case of books), or CSI divisions and codes (in the case of spec documents). In this latter case, one part of the document may have three levels 03, 30, and 00 corresponding to division 03, section 30, subsection 00 ("Cast in Place Concrete") of the MasterFormat 2004 standard. The document structure analysis subprocess may use section headings, tables of contents, information in headers or footers (See FIG. 12B, where "09 3000" (1210) is the CSI code, and "TILING" (1211) is the title of code "09 3000".), etc. to determine the correct section. Beyond the coarse part of the structure, at a minimum, sections listed under headings (1209) are listed with their headings, or in the event of an outline type format in the document with their outline tree descriptor (i.e. the three blocks indicated by 1204 would be "2.01.A", "2.01.A.1", and "2.01.B.1"). As previously indicated, in an example embodiment, the location of entities (e.g., words, multiword phrases) in the spec document is specified in terms of document structure (e.g., relative to section headings, etc.) as opposed to pagination (i.e., the page upon which the word appears). Hence, the hierarchical block descriptors generated at step 1080 may be used as a basis for specifying the locations of entities within spec documents. Additionally, the fact that a word appears in a particular division (under a particular node in the hierarchy) may be used in generating the graph shown in FIG. 3.

At step 1095, an index is constructed comprising the raw text entities (i.e., individual words, multiword phrases) and other entities (named entities, structure indicating entities, and relationship indicating entities), which are stored along with their position in the document. For each entity, the position includes the location of the entity within the hierarchy (e.g., a unique block ID) as well as an offset (e.g., the location of the entity with the uniquely identified block). For example, the position may include a block ID such as "2.01.B.1 in section 09 300 in document number 3,001" and sequential offset such as "the 5th word in the block" or "the phrase starting 5 words into the block." The detailed position information may be used in a variety of ways in addition to others already mentioned. For example, the detailed position information may permit individual words to be recombined into multiword sequences, e.g., if the user performs a search query using a multiword sequence that was not previously identified as an entity by the entity recognition system 125. This index is stored as the indexing and annotation data 114 in the data storage system 110.

The process shown in FIG. 10 is performed for every document stored in data storage system 110. As indicated previously, in the context of spec documents for the construction industry, this may be approximately on the order of tens of thousands or hundreds of thousands of documents or more per year, with each document typically being on the order of hundreds of pages or more in length. Hence, the indexing and annotation data 114 in the data storage system 110 comprises a detailed index of the words and other entities contained on the pages of the tens to hundreds of thousands of spec documents generated per year in the construction industry and stored in the data storage system 110, including detailed position information and other information describing the appearances of those entities in the spec documents.

The indexing and annotation data 114 may be accessed to provide the features described above in connection with FIGS. 2-9 (except for those described in connection with related tab 244 in FIG. 9). For example, and referring to FIG. 13, according to an example embodiment, if the user enters "Tyvek" in search field 210, at step 1310, the system 100 may scan the indexing and annotation data to identify occurrences of the term "Tyvek" in spec documents. Spec documents that contain the term "Tyvek" may be identified at step 1320. The spec documents may be filtered according to any other search criteria at step 1330. Finally, a screen display showing the pertinent data may be generated at step 1340.

Figure 14:
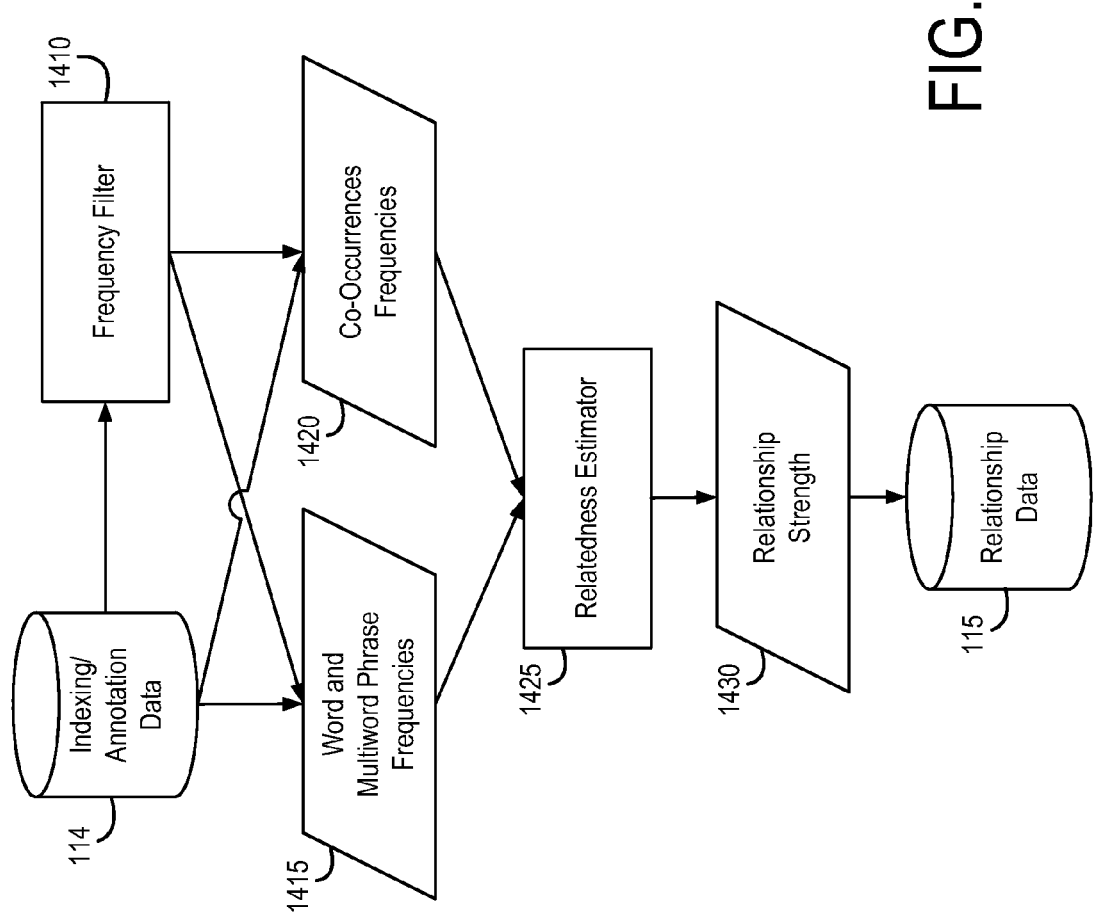
FIG. 14 shows operation of a relatedness engine of FIG. 1 according to an example embodiment.

Referring now to FIG. 14, FIG. 14 shows operation of the relatedness engine 130 in greater detail according to an example embodiment. The relatedness engine 130 uses the indexing/annotation data 114 generated by the process of FIG. 10 to the generate relationship data 115. The relatedness engine 130 and the relationship data 115 are used to provide features discussed above in connection with related tab 244 in FIG. 9.

The relationship data 115 comprises, for each entity (e.g., word, multiword phrase), relatedness scores that reflect the relatedness of that entity to other entities (words, multiword phrases) in the indexing and annotation data 114 (i.e., one relatedness score per entity-entity pair). That is, each entity is compared against every entity, and a related score is generated for each pair.

According to an example embodiment, the relatedness engine 130 generates a relatedness score for two entities (e.g., two words) based on the likelihood of the two entities appearing in a common text block 920. By way of example, the text under heading 2.03 in the example shown in FIGS. 11B and 12B reads as follows:

2.03 Grout Materials
  A. Manufacturers:
    1. Bonsal American, Inc; ProSpec Sanded Tile Grout 700: www.prospec.com.
    2. Custom Building Products; Prism SureColor Grout: www.custombuildingproducts.com.
    3. LATICRETE International, Inc; LATICRETE SpectraLOCK PRO Grout: www.laticrete.com.
    4. Substitutions: See Section 01 6000—Product Requirements.
  B. Grout: Polymer modified cement grout, sanded or unsanded, as specified in ANSI A118.7.

In the above example, the text located between the two section headings "Manufacturers" and "Grout" is considered a text block. In the above text block, there are certain words that appear, such as "ProSpec," "Prism," and "LATICRETE." The fact that these words appear within the same block of text suggests that these words may be related. In fact, these words are in a common block of text because they are all different types of grout. When this analysis is performed over tens of thousands or hundreds of thousands or more spec documents stored in the data storage system, a reliable relatedness score may be generated. That is, if "ProSpec," "Prism," and "LATICRETE" often appear together in the same blocks of text across many spec documents, then it is likely that they are related.

Related scores which reflect these probabilities may be generated and stored as the relationship data 115. Such data may be used to provide the features discussed above in connection with related tab 244 in FIG. 9. For example, if the user entered "ProsSpec" as a search term in search query field 210, and selected the related tab 244, the terms "Prism," and "LATICRETE" would appear as peers in column 246. Likewise, because the peers column 246 includes both products and companies, the manufacturers Custom Building Products (which manufactures LATICRETE grout) would also be listed. Conversely, if "ProSpec," "Prism," and "LATICRETE" occur in together in the same block of text only infrequently, then they are considered less related or not related at all, and they would not appear in the peers column 246. The peers column 246 may comprise a predetermined number of entities selected based on their relatedness scores, e.g., the ten products and companies that have the highest relatedness scores for the search term entered by the user. The same approach may be used for the standards column 248.

In practice, a variety of different mathematical approaches may be used for generating a relatedness score. For example, approaches may be used that are based on the statistics of the document. In a simple example embodiment, a conditional probability approach is used which calculates the condition probability of two entities appearing in the same text block, and conditional probabilities are then used as the relatedness score. That is, for a query word or phrase x, P(Y|X) is computed for each y in the data storage system, and the most related words and phrases are the y's with the highest conditional probabilities given the query x. For example, considering a word or phrase x, a binary random variable X may be defined that is 1 when that word or phrase occurs within a text block, and 0 otherwise. The probability distribution for X may be estimated such that the probability of a word or phrase x occurring in a sample text block, $p_x(i)$, is approximated by the total number of blocks in the construction project specifications 111 in which x occurs (FIG. 14, 1415) divided by the number of blocks in the construction project specifications 111. Similarly the joint probability of the word or phrase x occurring in the same block as word or phrase y, $p_{x,y}(i, j)$, can be estimated as the number of times in the project specifications 111 that x occurs (i=1), or does not occur (i=0) in the same text block 1320 that y occurs (j=1), or does not occur (j=0) in, divided by the total number of text blocks in the construction project specifications 111. The quality of these estimates can be improved using a smoothing technique such as Good-Turing smoothing. Conditional probabilities of x occurring in a text block, given that y occurs in a text block, can then be computed as $P(X=1|Y=1)=p_{x,y}(1,1)/p_y(1)$. Frequency filter 1410 may count relevant frequencies and related estimator 1425 may use the frequencies to calculate probabilities. These frequencies and probability estimates can either be stored within the indexing/annotation data 114, or generated on-the-fly by the frequency filter 1410.

As a concrete example, let x be the word "ProSpec". The relatedness estimator (FIG. 14, 1425) would allow y to take on all possible values, including "Prism". In this case, $p_x(1)$ is the fraction of blocks in which "ProSpec" appears, (FIG. 14, 1415), $p_y(1)$ is the fraction of blocks in which "Prism" (FIGS. 14, 1415), and $p_{x,y}(1,1)$ is the fraction of blocks in which both "ProSpec" and "Prism" occur (FIG. 14, 1420). Furthermore, the conditional probability $P(X=1|Y=1)$ can be estimated by relatedness estimator 1425 as $p_{x,y}(1,1)/p_y(1)$. In this simple sample embodiment, these conditional probabilities represent the relationship strength (FIG. 14, 1430) between the entities "ProSpec" and "Prism". Smoothing may be necessary for rare events. If probability is to be estimated on entities that are not indexed with 100% accuracy, then the probability estimate can be adjusted downward to account for false positives, or upward to account for false negatives. This process is performed for all combinations (possible pairs x, y) of entities in the indexing and annotation data 114.

Conditional probabilities are not symmetric, that is, (i.e. P(X|Y) may not equal P(Y|X)). For example, "it" and "the" will occur in the same block many times, so (using the notation $W_{word}$ to represent the binary random variable that is 1 when word appears in a block and 0 otherwise) both $P(W_{it}=1, W_{the}=1)$ and $P(W_{it}=1|W_{the}=1)$ will be high. "InfoTech" and "Carnivore" are much less likely to occur overall, so $P(W_{InfoText}=1, W_{Carnivore}=1)$ is likely to be low while $P(W_{InfoText}=1|W_{Carnivore}=1)$ should be moderately higher. $P(W_{Carnivore}=1, W_{InfoTech}=1)$ could be expected to be low as well, since it is only one of InfoTech's products.

Hence, while the use of conditional probability provide a useful relatedness measurement, alternative approaches may also be desired in order to enhance the meaningfulness of the relatedness score, such as approaches based on information theory and statistics that build upon and use conditional and joint probabilities as a basis for other relatedness scores. For example, the shared information metric may be used as a relatedness score to take the above-mentioned issues into account. The shared information metric relatedness score between a query x and a candidate can be computed as $H(Y_i|X)+H(X|Y_i)$ for all y in the corpus, where H(B|A) is the conditional entropy. For these binary variables, conditional entropy is defined as:

$$H(B|A) = \sum_{i \in \{0,1\}} \sum_{j \in \{0,1\}} p_{a,b}(i, j) \log \frac{p_a(i)}{p_{a,b}(i, j)}$$

Another of many relatedness scores suggested by statistical theory is using the chi-squared test to compare the distribution of the candidate phrases with a null-hypothesis of statistical independence.

Notably, the relationship extraction engine 130 may rely upon the entities being in the same block as opposed to being on the same page. Hence, the relatedness estimation may be based on proximity in terms of organization of the document as opposed to physical proximity. The fact that two terms appear in the same block of text may be more relevant to determining relatedness than the fact that the two terms are on the same page. For example, if two words appear on either side of a major section heading, the two words are probably not highly related, even though they are close in physical proximity on the page.

In another embodiment, a relatedness score is calculated using the relationship indicating entities, and to use counts (i.e. voting) or frequencies of phrases such as "<x> by <y>" or "<x>, a division or <y>" in much the same way the block-level conditional probabilities are used.

The relatedness engine 130 uses probability estimates for various features in the index or database. In some instances, these estimates may be stored in tables in the data storage system 110. A word or entity frequency is neither difficult nor space-prohibitive to store. For more complex relatedness requests received from a user (e.g. requesting relationships limited to a particular CSI division), however, the probabilities are computed "on-the-fly" on an as-needed basis. In this case, a probability estimator scans the database counting relevant frequencies, and using the frequencies to estimate the probabilities. With sufficient storage, joint probabilities (P(X, Y)) may also be stored in tables. If there is not sufficient storage for all pairs, then common pairs may be cached.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include one or more general purpose computers including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

We claim:

1. A computer-implemented method comprising:
   storing construction project specification documents in a data storage system, wherein the construction project specification documents have a uniform organizational structure that characterizes at least some common aspects of an organizational structure of the construction project specification documents, the uniform organizational structure defining the different parts of the construction project specification documents;
   receiving a search query comprising search criteria from a user electronically via a graphical user interface;
   analyzing information relating to the construction project specification documents to determine identified documents that satisfy the search criteria; and
   responsive to the search query, generating one or more displays reflecting data regarding the identified documents that satisfy the search criteria, the one or more displays including a plurality of charts, each of the plurality of charts being interactive such that each of the plurality of charts is configured to receive a user selection of a portion of an individual one of the plurality of charts to provide a modified search criteria that causes the remaining of the plurality of charts to change in response to the modified search criteria, the plurality of charts including:
a geography chart including a plurality of geographic regions reflecting the data regarding the identified documents that satisfy the search criteria associated with each of the plurality of geographic regions, wherein the geography chart is configured to receive a user selection of at least one of the plurality of geographic regions via the geography chart to provide the modified search criteria,
a timeline reflecting the data regarding the identified documents that satisfy the search criteria as a function of time, wherein the timeline is configured to receive a user adjustment of the timeline to focus on a specific time range to provide the modified search criteria,
a project ownership chart that reflects the data regarding the identified documents that satisfy the search criteria as a function of a plurality of types of ownership entities, wherein the project ownership chart is configured to receive a user selection of a type of ownership entity via the project ownership chart to provide the modified search criteria, and
a document format chart that reflects the data regarding the identified documents that satisfy the search criteria as a function of different parts of the construction project specification documents, wherein the document format chart is configured to receive a user selection of a specific part of the construction project specification documents via the document format chart to provide the modified search criteria.

2. A method as defined in claim 1, further comprising:
receiving the modified search criteria from the user via one of the plurality of charts; and
updating the data shown in the remaining of the plurality of charts to reflect the modified search criteria.

3. A method as defined in claim 2, wherein receiving the modified search criteria includes receiving, from the user via the one or more displays, a selection of a geographic region of the plurality of geographic regions.

4. A method as defined in claim 1, wherein the search criteria is first search criteria, wherein the identified documents are first identified documents, wherein the search query further comprises a second search criteria, and wherein the timeline further reflects data regarding second identified documents that satisfy the second search criteria as a function of time.

5. A method as defined in claim 2, wherein receiving the modified search criteria includes receiving modified search criteria from the user via the timeline, the modified search criteria comprising dates the construction project specification documents must satisfy in order to satisfy the search criteria.

6. A method as defined in claim 1, wherein the geography chart is a map, and wherein each geographic region of the plurality of geographic regions is color-coded to reflect data regarding the identified documents that satisfy the search criteria as a function of the plurality of geographic regions.

7. A method as defined in claim 6, wherein the search criteria is first search criteria, wherein the identified documents are first identified documents, wherein the search query further comprises second search criteria, and wherein the map further reflects data regarding second identified documents that satisfy the second search criteria as a function of geographic region.

8. A method as defined in claim 3,
wherein the selection comprises geographic constraints the construction project specification documents must satisfy in order to satisfy the search criteria.

9. A method as defined in claim 1,
wherein the search query comprises at least one search term; and
wherein the document format chart reflects a number of times the search term is located in the different parts of the construction project specification documents.

10. A method as defined in claim 9, wherein the search term is a first search term, wherein the number of times is a first number of times, wherein the search query further comprises a second search term, and wherein the document format chart further reflects a second number of times the second search term is located in the different parts of the construction project specification documents.

11. A method as defined in claim 9, further comprising:
receiving modified search criteria from the user via the document format chart, wherein the modified search criteria comprising constraints on the different parts of the construction project specification documents that must contain the search term in order to satisfy the search.

12. A method as defined in claim 1, wherein the plurality of charts includes a chart reflecting data regarding the identified documents associated with construction projects that are at a specified stage of completion.

13. A method as defined in claim 12, wherein the search criteria is first search criteria, wherein the identified documents are first identified documents, wherein the search query further comprises second search criteria, and wherein the chart further reflects data regarding second identified documents associated with construction projects that are at a specified stage of completion.

14. A method as defined in claim 12, further comprising:
receiving modified search criteria from the user via the chart reflecting the data regarding identified documents associated with construction projects that are at the specified stage of completion, wherein the modified search criteria comprising constraints on stages of completion that projects associated with the construction project specification documents must satisfy in order for the construction project specification documents to satisfy the search criteria; and
updating the data shown in the remaining charts to reflect the modified search criteria.

15. A method as defined in claim 1, wherein the search query is received from the user via a globally accessible public communication network.

16. A method as defined in claim 1, wherein the documents have a uniform organizational structure that characterizes at least some common aspects of an organizational structure of the documents.

17. A method as defined in claim 1, wherein the plurality of charts includes a chart reflecting the number of documents associated with different categories of construction projects.

18. A system comprising:
a data storage system having documents stored therein, wherein the documents have a uniform organizational structure that characterizes at least some common aspects of an organizational structure of the documents, the uniform organizational structure defining the different parts of the documents;

data analysis logic configured to analyze the documents and to identify documents that satisfy search criteria received from a user; and user interface logic configured to generate a user interface, the user interface logic configured to generate a plurality of charts for display to the user, wherein each chart presents data relating to the identified documents that satisfy a search criteria received from the user, wherein each of the plurality of charts are interactive such that each of the plurality of charts is configured to receive a user selection of a portion of an individual one of the plurality of charts to specify modified search criteria, and wherein the user interface logic is configured to receive modified search criteria from the user via one of the charts and to update the remaining charts to reflect the modified search criteria;

wherein the plurality of charts includes:

a geography chart including a plurality of geographic regions reflecting the data regarding the identified documents that satisfy the search criteria associated with each of the plurality of geographic regions, wherein the geography chart is configured to receive a user selection of at least one of the plurality of geographic regions via the geography chart to provide the modified search criteria, a timeline reflecting the data regarding the identified documents that satisfy the search criteria as a function of time, wherein the timeline is configured to receive a user adjustment of the timeline to focus on a specific time range to provide the modified search criteria, a project ownership chart that reflects the data regarding the identified documents that satisfy the search criteria as a function of a plurality of types of ownership entities, wherein the project ownership chart is configured to receive a user selection of a type of ownership entity via the project ownership chart to provide the modified search criteria, and a document format chart that reflects the data regarding the identified documents that satisfy the search criteria as a function of different parts of the construction project specification documents, wherein the document format chart is configured to receive a user selection of a specific part of the construction project specification documents via the document format chart to provide the modified search criteria.

19. A system as defined in claim 18, wherein the modified search criteria is received through a user selection of at least one of the plurality of geographic regions of the geography chart, and wherein the plurality of charts are updated based on the modified search criteria.

20. A system as defined in claim 18, wherein the plurality of charts include a chart reflecting portions of the documents that satisfy the search criteria.

21. A system as defined in claim 18, wherein the geography chart is a map, and wherein each geographic region of the plurality of geographic regions is color-coded to reflect a number of the identified documents that satisfy the search criteria as a function of the plurality of geographic regions.

22. A method as defined in claim 9, wherein the uniform organization structure is a Construction Standards Institute ("CSI") format, and wherein the document format chart is a CSI divisions chart.

* * * * *